July 5, 1938.    R. R. ALLINGHAM    2,122,551
APPARATUS FOR MIXING VOLATILE LIQUIDS WITH SOLID MATERIALS
Filed June 18, 1935

INVENTOR
Ralph R. Allingham
BY
ATTORNEY

Patented July 5, 1938

2,122,551

UNITED STATES PATENT OFFICE 2,122,551

APPARATUS FOR MIXING VOLATILE LIQUIDS WITH SOLID MATERIALS

Ralph R. Allingham, White Plains, N. Y., assignor to The Barrett Company, New York, N. Y., a corporation of New York Application June 18, 1935, Serial No. 27,170

8 Claims. (Cl. 259—14)

This invention relates to mixing volatile liquids with solid materials and is particularly applicable to the ammoniation of phosphatic materials.

Processes which have heretofore been in general use for mixing volatile liquids, such as anhydrous ammonia, aqua ammonia, or ammonia salt solutions with solid materials, such as phosphates, superphosphates or the like suffer from certain disadvantages. For example, in the ammoniation of superphosphates, it has been customary to spray ammonia solution onto the surface of the solid material while the latter is being tumbled in a mixing drum. In such a process considerable difficulty is encountered due to the fact that the nozzle through which the volatile fluid is sprayed tends to become clogged with solid superphosphate material, thus slowing up the mixing operation considerably and necessitating frequent clearing of the apparatus. Furthermore, considerable quantities of the volatile ammonia do not come into sufficiently close contact with the solid superphosphate to be absorbed, with the result that this unabsorbed gas is swept out of the mixing drum as such, or in combination with steam generated by the heat developed during the ammoniation of superphosphate which heat converts water present in the superphosphate to steam. As a consequence a considerable quantity of valuable ammonia is lost into the atmosphere, thereby causing a nuisance and increasing the occupational hazard involved in such operations.

An object of the present invention is to provide a process and apparatus for mixing volatile liquids with solid materials which avoid the disadvantages hereinabove pointed out.

Briefly the apparatus of the present invention comprises a rotary mixing drum which is adapted to contain a solid material, having the exit openings of one or more flexible distributors for the volatile liquid disposed below the level of the solid material within the mixing drum. During the course of operation of this apparatus the volatile liquid is distributed throughout the mass of solid material, by the flexible distributors without clogging of the latter by the solid material and without loss of the volatile material.

Thus in the operation of the apparatus the volatile liquid, which may be aqua ammonia, anhydrous ammonia or ammonia salt solutions, is introduced under the surface of a tumbling mass of solid material such as superphosphate, or superphosphate mixtures while clogging of the openings through which the volatile liquid is introduced is prevented and the volatile liquid is readily and efficiently absorbed by the solid material.

In the drawing Fig. 1 depicts a side elevation of a preferred form of the apparatus of this invention;

Figure 1:
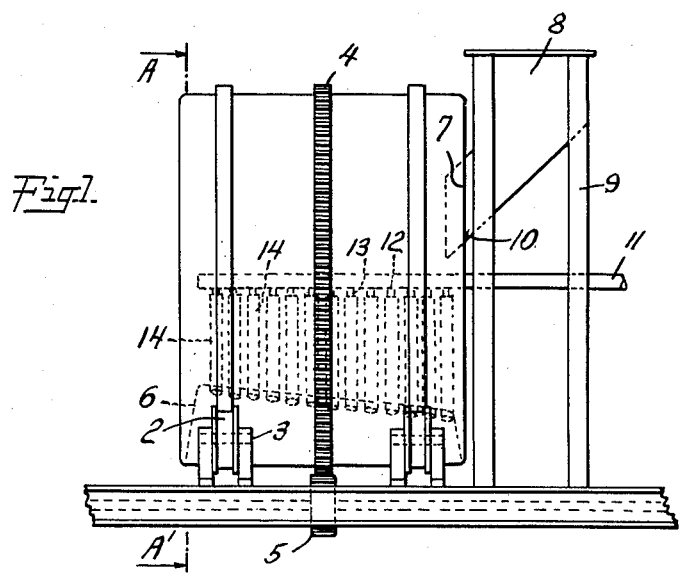

Referring to the drawing, the preferred form of the apparatus of this invention comprises a mixing drum 1 of any well known design which may be rotatably mounted on flanged rollers 2 which in turn are freely supported by means of trunnions 3. The mixing drum 1 is rotatably actuated by means of a continuous circumferentially mounted sprocket or rack 4 connected to a prime mover by a sprocket 5. Mixing blades 6 are spaced at suitable intervals on the interior surface of the drum for the purpose of maintaining the solid material therein in constant agitation. Piercing one of the end faces of the mixing drum 1 is a charging inlet 7 through which solid material may be admitted thereto. The solid material, prior to the introduction thereof to the mixing drum, is contained in a hopper 8 mounted on a standard 9 and having a retractable inclined chute 10 attached thereto which may be introduced into the charging inlet 7, provided with a suitable closure, not shown, during the charging operation and which may be retracted during the mixing process.

If desired, the end face through which the material is charged may be separate from the drum and independently supported so that the latter rotates while the end face is stationary. With such construction a stationary or fixed hopper 8 may be employed having its charging inlet 7 passing through a sealed opening in the end plate of the drum.

An inlet for the volatile liquid is provided in the form of a header pipe 11 which pierces one face of the mixing drum and which may extend coaxially therewith as shown on the drawing or may be disposed beneath the axis of the drum. Header pipe 11 is provided, in that portion thereof extending within the interior of the mixing drum with a plurality of openings 12 which may be aligned or staggered, as desired. Secured to the openings 12 are hollow metal nipples 13 connecting the header pipe with a plurality of flexible distributing pipes 14 which extend downwardly to a point below the level of the solid material contained within the drum. The flexible distributing pipes 14 may be of any suitable material resistant to the action of the volatile liquid. Rubber reinforced with canvas or wire may be used.

Figure 2:
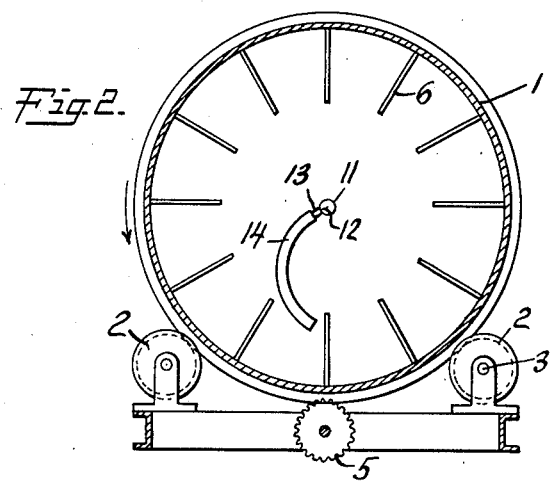
Fig. 2 depicts a sectional view of the apparatus of Fig. 1 taken through the plane A—A'.
Figure 3:
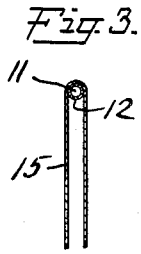
Fig. 3 depicts an end elevational view, in section, of an alternative form of header pipe and fluid distributing means.
Figure 4:
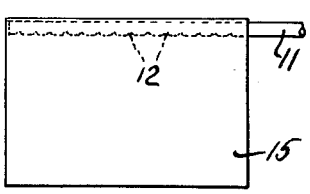
Fig. 4 depicts an elevational view of the header pipe of Fig. 3.

In Figs. 3 and 4 is depicted an alternative form of distributor for volatile liquid. This form comprises a header pipe 11 having openings 12 piercing that portion thereof which extends into the interior of the mixing drum and provided with a tent or hood 15, preferably of rubberized canvas reinforced with wire. The tent envelops the header pipe and extends downwardly to a point below the level of the solid material within the mixing drum 1. If desired the tent construction of Fig. 4 may be employed with the flexible pipes of Fig. 2, i. e., all or some of the pipes of Fig. 2 may be secured to a canvas or other tent draped over the pipes.

In the operation of the apparatus of this invention, as for example, in the ammoniation of superphosphate, the solid finely divided superphosphate is introduced into the mixing drum from the hopper 8 via chute 10 and charging inlet 7 until the solid material within the drum reaches a suitable level, preferably somewhat below the level of the axis of the drum and above the mixing blades 6. The retractable chute 10 may then be withdrawn, the inlet 7 closed, and the mixing drum rotated. The solid material, which collects in the pockets formed by the mixing blades is carried in the direction of rotation of the mixing drum by means of the mixing blades 6 until they reach a point where they are inclined downwardly at an angle sufficient to cause the material to slide from the surface thereof and to fall downwardly onto the main body of the solid material within the drum. The ammoniating liquid, which may be anhydrous ammonia, aqua ammonia or ammonium salt solutions is introduced through pipe 11, and in the case of the apparatus of Figs. 1 and 2 the stream thereof broken up into a plurality of minor streams by means of the openings 12 which pierce the inlet pipe. The smaller streams of ammoniating liquid are then directed, by means of the flexible distributing pipes 14, to a point beneath the surface of the solid material where efficient absorption takes place. Owing to the rotation of the mixing drum, agitation of the solid material contained therein takes place effecting intimate contact between the solid material and volatile liquid. Furthermore, as the drum rotates the flexible distributors are agitated both by the blades 6 striking the ends of the distributor pipes and the solid material falling on the distributors thus tending to maintain the distributors free of solid material, i. e., not clogged therewith. The beating or agitating effect imparted to the distributor inlets by the material falling thereon is somewhat more pronounced in the modification involving a tent or covering draped over the distributor pipes as compared with the form shown in Fig. 2 in which no such tent is employed.

The inlet for the volatile liquid as indicated in Fig. 2 is maintained continuously beneath the surface of the solid material, that is to say, a layer of solid material is maintained above the point of release of volatile liquid. Consequently, escape into the atmosphere of gas formed by volatilization of liquid during the course of operation is minimized, if not eliminated and thorough mixing of liquid and solid material with efficient absorption by the solid material of the volatile liquid and any gas formed is accomplished. Moreover, the motion of the distributing pipes and the agitation of the solid material serves to constantly bring the volatile liquid into close contact with fresh quantities of superphosphate, thus ensuring rapid as well as efficient ammoniation.

It will be understood that the apparatus of the present invention is not limited to the details of construction described above, but variations may be made therein without departing from the scope of this invention.

I claim:

1. In an apparatus for mixing volatile liquids with solid materials, in combination, a mixer adapted to contain a body of solid material, means extending into the lower portion of said mixer for introducing the volatile liquid beneath the surface of said body of solid material, and means movable relatively to the fluid introducing means for simultaneously agitating said body of solid material and for engaging said introducing means thereby to agitate said introducing means to prevent clogging of the latter by said solid material.

2. In an apparatus for mixing volatile liquids with solid materials, in combination, a rotary drum mixer adapted to contain a body of solid material, mixing blades circumferentially disposed on the interior of said drum, an inlet pipe for volatile liquids provided with openings therein, and flexible distributors connected with said openings and of a length such that the discharge ends thereof are beneath the level of said body of solid material.

3. In an apparatus for mixing volatile liquids with solid materials, in combination, a rotary drum mixer adapted to contain a body of solid material, mixing blades circumferentially disposed on the interior of said drum, an inlet pipe having openings therein for flow of volatile liquids therethrough, and a flexible tent draped over said inlet pipe and said openings, said tent being of a length such that the discharge openings thereof are beneath the level of the solid material in said drum.

4. In an apparatus for mixing volatile liquids with solid materials, in combination, a tumbling drum, a conduit for said volatile liquids extending through a head of said drum and along a path within the drum above the lower portion thereof, and flexible tubes connected to said conduit and depending into the lower portion of said drum, whereby the volatile liquid will flow through said conduit and tubes, and out of the lower end of said tubes beneath the surface of said solid material during tumbling.

5. In a tumbling drum for mixing ammoniacal liquids with phosphate containing solids in combination, a plurality of peripheral elevating members in said drum, a liquid conducting means extending into said drum at an elevated position therein, and flexible liquid conducting means communicably connected with said first mentioned conducting means, extended downwardly therefrom and of a length to be contacted by said members whereby said flexible means will be agitated by said members to remove any deposit of solid material therein.

6. A reaction vessel comprising, in combination, a container adapted to be filled partially with a body of solid material, fluid introducing means of a length to extend into the lower portion of said container with an outlet of said means beneath the surface of said body of solid material, and driven agitating means movable relatively to the fluid introducing means to agitate the body of solid material and to engage the introducing means, thereby to agitate said introducing means.

7. A reaction vessel comprising, in combination, a container adapted to be filled partially with a body of solid material, flexible fluid introducing means fixedly mounted above the lower portion of said container and of a length to depend into the lower portion of said container, said means having an outlet at the lower end, and means to agitate the body of solid material and to engage the lower end of said means.

8. A reaction vessel comprising, in combination, a container adapted to be filled partially with a body of solid material, flexible fluid introducing means of a length to extend into the lower portion of said container with an outlet of said means beneath the surface of said body of solid material, and driven agitating means movable relatively to the fluid introducing means to agitate the body of solid material and to engage the introducing means thereby to agitate said introducing means.

RALPH R. ALLINGHAM.